United States Patent
Fan et al.

(10) Patent No.: US 10,352,465 B2
(45) Date of Patent: Jul. 16, 2019

(54) ROD GUIDE ASSEMBLY AND VALVE

(71) Applicants: Honeywell International Inc., Morris Plains, NJ (US); Shaolong Fan, Shanghai (CN); Jiayi Shen, Shanghai (CN); Wen Luo, Shanghai (CN)

(72) Inventors: Shaolong Fan, Shanghai (CN); Jiayi Shen, Shanghai (CN); Wen Luo, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/039,502

(22) PCT Filed: Jun. 30, 2015

(86) PCT No.: PCT/CN2015/082810
§ 371 (c)(1),
(2) Date: May 26, 2016

(87) PCT Pub. No.: WO2017/000209
PCT Pub. Date: Jan. 5, 2017

(65) Prior Publication Data
US 2018/0106391 A1    Apr. 19, 2018

(51) Int. Cl.
*F16K 27/08*    (2006.01)
*F16K 41/04*    (2006.01)
*F16K 1/04*    (2006.01)

(52) U.S. Cl.
CPC .............. *F16K 27/08* (2013.01); *F16K 41/04* (2013.01); *F16K 1/04* (2013.01)

(58) Field of Classification Search
CPC ............. F16K 27/08; F16K 41/04; F16K 1/04
See application file for complete search history.

(56) References Cited

U.S. PATENT DOCUMENTS

| | | | | |
|---|---|---|---|---|
| 3,443,789 A | * | 5/1969 | Bucklin | F16K 1/02 137/315.36 |
| 3,679,169 A | * | 7/1972 | Bedo | F16K 1/38 251/88 |
| 4,114,851 A | * | 9/1978 | Shivak | F16K 1/38 251/122 |
| 6,199,396 B1 | * | 3/2001 | Aizawa | F16K 1/10 137/360 |
| 2006/0283791 A1 | * | 12/2006 | Ross | B01D 35/02 210/429 |

* cited by examiner

Primary Examiner — Marina A Tietjen
(74) Attorney, Agent, or Firm — Loza & Loza LLP; Kermit D. Lopez

(57) ABSTRACT

A rod guide assembly for a valve, which includes a rod guide cover and a rod guide body that engage with each other, wherein the rod guide cover together with the rod guide body define a guide channel in which a rod slides. The friction coefficient between the rod guide body and the rod is smaller than the friction coefficient between the rod guide cover and the rod.

20 Claims, 3 Drawing Sheets

ROD GUIDE ASSEMBLY AND VALVE

CROSS-REFERENCE TO RELATED APPLICATION

This patent application is the U.S. National Phase application of PCT (Patent Cooperation Treaty) application number PCT/CN2015/082810 having a PCT filing date of Jun. 30, 2015, the disclosure of which is hereby incorporated by reference in its entirety.

TECHNICAL FIELD

Embodiments are related to valves with slide rod(s) and in particular to a rod guide assembly for valves and valves having such a rod guide assembly.

BACKGROUND

In industries that make use of pipes for the delivery of gas or fluid, valves such as shut-off valves are common components. Such valves generally include a rod connected with the valve body. The rod automatically performs a linear movement in response to a valve shut off due to downstream pressure that is above or below a predefined point. The rod is guided in a rod guide assembly for protection and sealing.

As shown in FIG. 1, a common used rod guide assembly 10 includes a general disc-shaped cover part 11 and a cylinder-shaped body part 12 which has a smaller diameter comparing to the cover part 11. The cover part 11 together with the body part 12 defines a guide channel in which the valve rod 40 slides. The cover part 11 and the body part 12 are formed integrally. The body part 12 can be inserted in a port of a valve casing 50 and the cover part 11 is secured to the casing 50 via a connecting means such as one or more screws 18. As shown in FIG. 1, a retainer 17 is positioned in a lower end of the body part 12 such that a first seal 13 and the back-up rings 15 are supported in a lower recess of the body part 12 to seal the engagement between the rod 40 and the rod guide assembly 10.

The commonly used rod guide assembly 10 possesses a number of drawbacks. For example, considering the strength requirement of the integrated formed rod guide assembly 10, the rod guide assembly 10 may only be configured from a high strength material such as alloy steel. However, such a material usually has a higher friction coefficient with the valve rod 40 (e.g., usually made from steel) which can result in a poor guiding performance.

In the case of the integrated formed rod guide assembly 10, the first seal 13 is held by means of a retainer 17. Due to the dimension of the retainer 17 and therefore a larger lower area of the body part 12 contacting with the fluid, the rod guide assembly 10 is subjected to a significant force $F_p$ from the fluid, which tends to pull the rod guide assembly 10 apart especially in the case of the fluid having a high pressure such as above 10 Mpa (i.e., PED certificate class 600#). Thus, the screws 18 should have a higher strength to assist in maintaining the rod guide assembly 10 in place. A solution to this problem may be to increase the size of the screws 18, which is not allowable in compact circumstances. Another solution may involve selecting material with higher strength for screws 18, but this approach increases the cost.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a rod guide assembly for valves with an enhanced guide performance.

It is another aspect of the disclosed embodiments to provide for a rod guide assembly for valves, which can be utilized in high-pressure environments (e.g., above 10 Mpa).

It is yet another aspect of the disclosed embodiments to provide for a low-cost rod guide assembly that can be easily assembled, fixed, easily removed, etc.

The aforementioned aspects and other objectives and advantages can now be achieved as described herein. In one example embodiment, a rod guide assembly is provided, which can be utilized in any valves with a sliding rod such as shut-off valves. The rod guide assembly includes a rod guide cover and a rod guide body that can engage with each other. The rod guide cover together with the rod guide body can define a guide channel in which the rod slides, wherein the friction coefficient between the rod guide body and the rod is smaller than the friction coefficient between the rod guide cover and the rod.

In an example embodiment, the rod guide cover can be configured from a first material with a first friction coefficient $F_1$ relative to the rod, and the rod guide body can be configured from a second material with a second friction coefficient $F_2$ relative to the rod, wherein $F_1 > F_2$.

In some example embodiments, the rod guide cover can be configured from a first material having a first strength $S_1$, and the rod guide body can be configured from a second material having a second strength $S_2$ wherein $S_1 > S_2$. In some example embodiments, the first material can be alloy steel and the second material can be copper alloy. Due to the separable rod guide assembly (i.e., comprising rod guide cover and rod guide body engaged with each other), the rod guide cover can have a higher strength and the rod guide body can possess a lower friction coefficient with the rod, which can be achieved by selecting different materials, different heat treatments, or different machining processes. Therefore, the guiding performance can be improved.

In some example embodiments, the rod guide body defines the main part of the guide channel. In yet another example embodiment, the rod guide assembly can include a first seal, which is constrained in a position between the rod guide cover and the rod guide body, the first seal being arranged around the rod for sealing the engagement between the rod and the rod guide assembly. Due to the separable rod guide assembly (i.e., comprising rod guide cover and rod guide body engaged with each other), the first seal can be easily arranged between rod guide cover and rod guide body. Therefore, the area of the lower end of the rod guide body contacting the fluid can be decreased, in which case the rod guide assembly can be utilized in high-pressure circumstances (e.g., 10 Mpa or above).

In another example embodiment, the rod guide cover can include a threaded recess, the rod guide body comprising a first end or an upper end in the proximity of the rod guide cover, and a second end or a lower end contacting the fluid. The first end can include a threaded outer surface, and the rod guide body can engage with the rod guide cover via the engagement between the threaded recess of the rod guide cover and the threaded outer surface of the first end of the rod guide body.

In some example embodiments, a recess for housing the first seal can be formed at the first end of the rod guide body. In an example embodiment, the rod guide body can include a flange, the upper edge of the flange engaging with the rod guide cover, and the lower edge of the flange engaging with a stepped boss on the valve casing. In another example embodiment, the flange can include an outer surface shaped for engaging with a driving tool. The threaded engagement between the rod guide cover and the rod guide body and the flange, which can be driven by a driving tool, is such a simple structure for the assembly and disassembly of the rod guide assembly.

In an example embodiment, lock glue for loosening-proof can be applied between the rod guide cover and the rod guide body. In another example embodiment, the rod guide cover can be secured to the valve casing by screws. In yet another example embodiment, the rod guide cover includes a slot at the lower surface. With the slot, the rod guide cover can be easily leveled out by means of tools such as a screw driver.

In another example embodiment, a second seal can be disposed around the rod guide body in the proximity of the second end of the rod guide body, the second seal sealing the engagement between the rod guide assembly and the valve casing.

In yet another example embodiment, a rod guide assembly can be provided, which can be utilized in any valves with sliding rod such as shut-off valves. The rod guide assembly can include a rod guide cover and a rod guide body capable of engaging with each other. The rod guide cover together with the rod guide body can define a guide channel in which the rod is sliding, wherein the rod guide assembly comprising a first seal which is constrained in a position between the rod guide cover and the rod guide body. The first seal can be arranged around the rod for sealing the engagement between the rod and the rod guide assembly.

In still another example embodiment, a rod guide assembly can be provided, which can be used in any valves with sliding rod such as shut-off valves. In such an example embodiment, the rod guide assembly can include a rod guide cover and a rod guide body engaging with each other. The rod guide cover together with the rod guide body can define a guide channel in which the rod is sliding, wherein the rod guide cover comprises a threaded recess, and the rod guide body includes a first end in the proximity of the rod guide cover and a second end contacting with the fluid, the first end comprising a threaded outer surface, the rod guide body engaging with the rod guide cover via the engagement between the threaded recess of the rod guide cover and the threaded outer surface of the first end of the rod guide body.

In still another example embodiment, a rod guide assembly which can be used in any valves with sliding rod such as shut-off valve can be provided. Such a rod guide assembly can include a rod guide cover and a rod guide body engaging with each other, the rod guide cover together with the rod guide body defining a guide channel in which the rod is sliding, wherein the rod guide cover adapted for engaging with a port of a valve casing, the rod guide body defining the main part of the guide channel.

In yet another example embodiment, a valve with a rod guide assembly is disclosed.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

Throughout the specification and claims, terms may have nuanced meanings suggested or implied in context beyond an explicitly stated meaning. Likewise, the phrase "in one embodiment" or "in one example embodiment" as used herein, for example, does not necessarily refer to the same embodiment and the phrase "in another embodiment" or "another example embodiment" as used herein does not necessarily refer to a different embodiment. It is intended, for example, that claimed subject matter include combinations of example embodiments in whole or in part.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
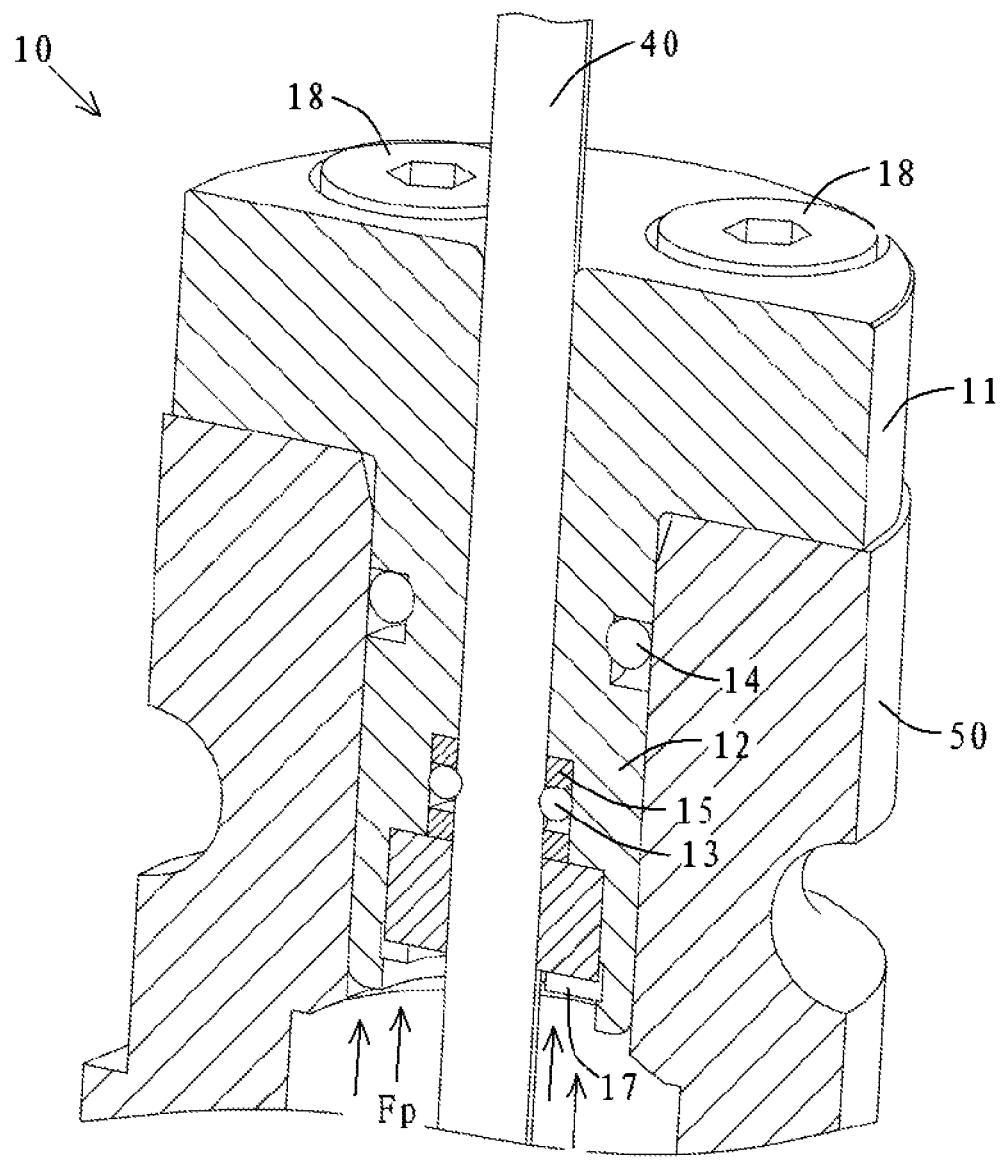
FIG. 1 illustrates a sectional view of a prior art rod guide assembly.
Figure 2:
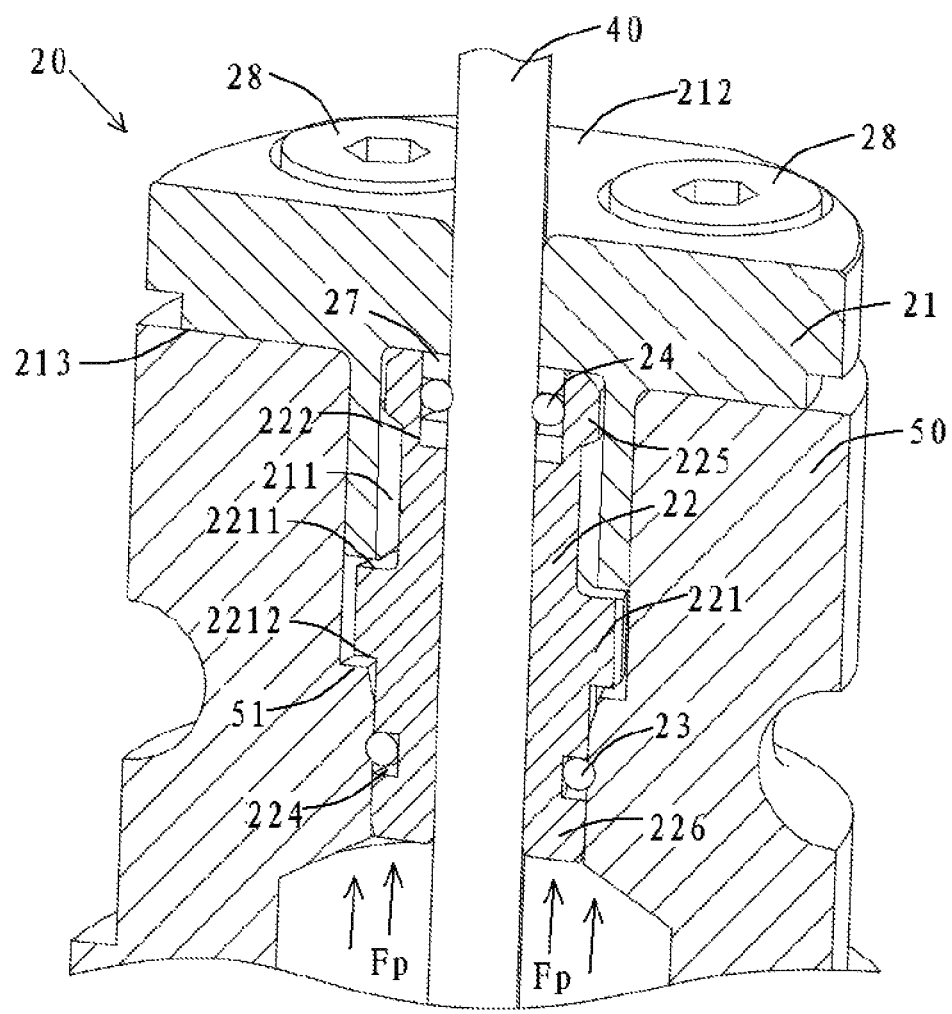
FIG. 2 illustrates sectional view of a rod guide assembly according to an example embodiment.
Figure 3:
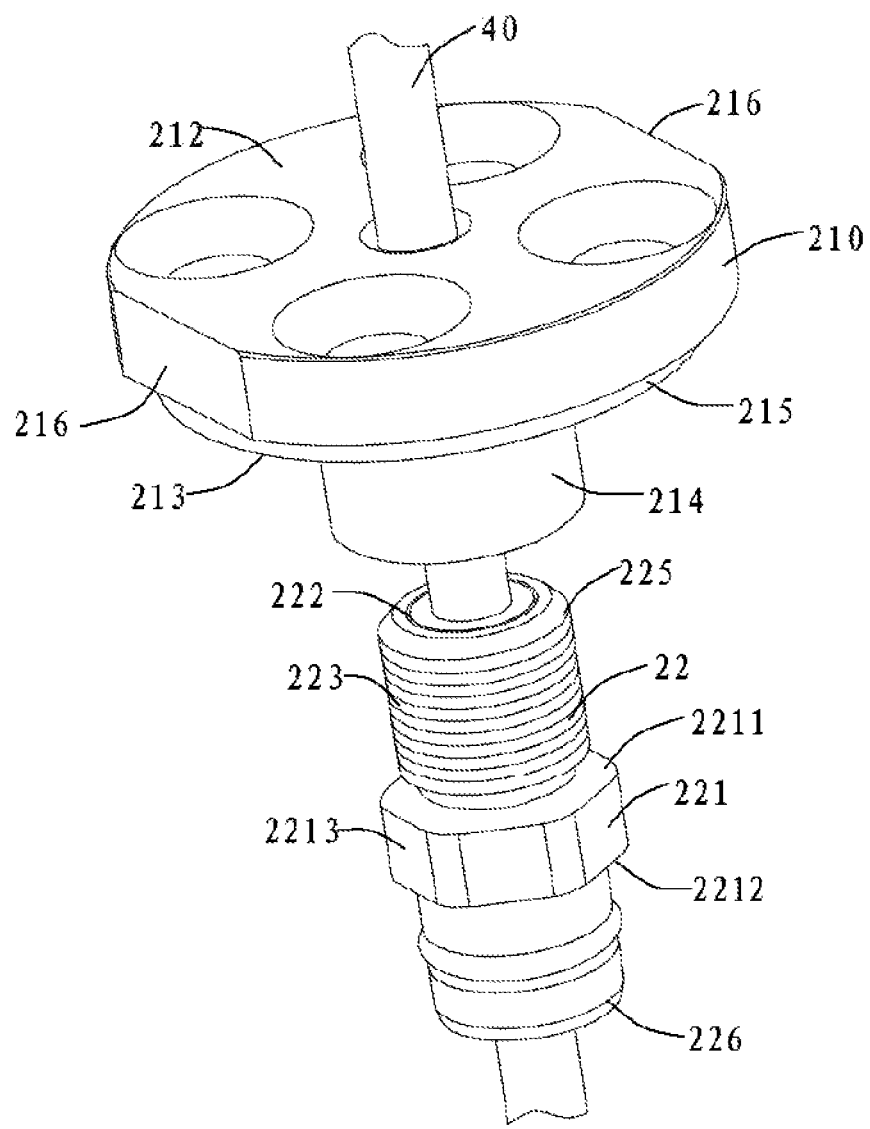
FIG. 3 illustrates a perspective view of a rod guide assembly with a rod guide cover and the rod guide body in a separate condition, in accordance with an example embodiment.

Referring now to FIGS. 2-3, a rod guide assembly 20 is shown in an assembled condition and a separate condition, respectively, in accordance with an example embodiment. The rod guide assembly 20 can include a rod guide cover 21 and a rod guide body 22 engaging with each other. The rod guide cover 21 together with the rod guide body 22 can define a guide channel in which the valve rod 40 is sliding. Due to the design of separable rod guide cover 21 and rod guide body 22, the rod guide cover 21 and the rod guide body 22 can be made from different materials. Additionally, the rod guide cover 21 and the rod guide body 22 can undergo different machining process or heat treatment to acquire different physical property.

Considering the strength requirement to secure the rod guide cover 21 to the port of the valve casing 50, the rod guide cover 21 can be selected from a first material with a higher strength $S_1$ and a friction coefficient $F_1$ relative to the rod 40. Considering the rod guide body 22 defining the main part of the guide channel, the rod guide body 22 can be selected from a second material with strength $S_2$ and a lower friction coefficient $F_2$ relative to the rod 40, wherein in a preferred example, embodiment $S_1>S_2$ and $F_1>F_2$.

In an example embodiment, the first material can be alloy steel and the second material can be copper alloy. Due to commonly used and low cost materials, the rod guide assembly 20 is cost efficient. The alloy steel has a higher strength and the copper alloy has better guiding performance, for example, the $F_2$ of the copper alloy might be about 0.22 relative to the valve rod 40 made from steel comparing to about 0.5-0.8 which of the common used alloy, steel. Therefore, the guide performance is significantly improved.

In an example embodiment, the rod guide body 22 has a first end 225 engaging with the rod guide cover 21 and a second end 226 contacting with the fluid. A recess 222 is formed at the first end 225 of the rod guide body 22 for housing a first seal 24 such as an O-ring. The first seal 24 and the back-up rings 27 thereof can be housed in the recess 222. In an assembled condition, the first seal 24 can be disposed at a position between the rod guide body 22 and the rod guide cover 21. Due to the separable design of the rod guide body 22 and the rod guide cover 21, it is easy to arrange the first seal 24 therebetween such that the retainer at the second end 226 of rod guide body 22 can be eliminated.

Because of the removal of the retainer, the second end 226 of the rod guide body 22 can be made as small as possible. It is well known that the force from a fluid equals to the pressure P multiply by the area S, since the pressure P is constant, the force is decreased with the decreasing area S. Therefore, the force Fp exerted on the rod guide assembly 20, which tends to pull it apart from the valve casing 50, is decreased. This is advantageous in conditions where the fluid has a higher pressure (e.g., 10 Mpa and above). Due to the decreased force Fp exerted on the lower end of the rod guide body 22, the screws 28 can remain small or low cost. The first seal 24 can be disposed in a recess 222 of the rod guide body 22. However, in an alternative example embodiment, the first seal 24 can be disposed in a recess formed on a position of the rod guide cover 21.

In the example embodiment shown in FIG. 3, the rod guide cover 21 has a general disk-shaped part 210 which has an upper surface 212 and a lower surface 213. A cylinder part 214 extends downward from the center of the lower surface 213. The cylinder part 214 of the rod guide cover 21 has a recess 211 (i.e., see FIG. 2) with a thread (not shown). The first end 225 of the rod guide body 22 has an outer surface with a thread 223 corresponding to the thread in the recess 211 of the rod guide cover 21. By means of the engagement of the thread of the recess of the rod guide cover 21 and the thread 223 of the rod guide body 22, the rod guide body 22 can screw into the rod guide cover 21. In one example embodiment, lock glue or other adhesion agent can be applied on threads for loosening-proof. The engagement between the rod guide cover 21 and the rod guide body 22 via threads is therefore easily achieved and reliable.

In an example embodiment, a slot 224 for a second seal 23 such as an O-ring can be formed on the outer surface of the rod guide body 22 near the second end 226. The second seal 23 can seal the engagement between the port of the casing 50 and the rod guide assembly 20.

In an example embodiment, the rod guide body 22 can include a flange 221. In the assembled condition shown by FIG. 2, the upper edge 2211 of the flange 221 is depicted as engaging with the lower end of the cylinder part 214, while the lower edge 2212 of the flange 221 is shown as engaging with a stepped boss 51 on the inner surface of the valve casing 50. The engagement of the lower edge 2212 with the stepped boss 51 constrains the position of the rod guide assembly 20 in the port of the valve casing 50. Preferably, the flange 221 has an outer surface 2213 adapt for engaging with a driving tool.

For example, as shown in FIG. 3, the outer surface 2213 can be hexagonal to be driven by a common driving tool for easy assembly and disassembly. Preferably, lock glue or another adhesion agent can be applied on the outer thread 223 to avoid loosening. It should be understood that in alternative embodiments, instead of a threaded engagement between the rod guide body 22 and the rod guide cover 21, other engaging means can be applied to secure the rod guide body 22 to the rod guide cover 21. The lock glue or other adhesion agent also can be applied in these circumstances.

In an example embodiment, the rod guide cover 21 can be secured to the port of the valve casing 50 by means of screws 28. At least one slot 215 can be provided on the lower surface 213 of the rod guide cover 21. The rod guide assembly 20 can be leveled out from the port of the valve casing 50 through the slot 215 by means of tools like a screw driver. In the example embodiment shown in FIG. 3, the slot 215 extends across the whole circumference of the lower surface 213 of the rod guide cover 21. However, in alternative embodiments, it can only extend a part of the circumference of the lower surface 213 of the rod guide cover 21

In an example embodiment, the rod guide cover 21 has two opposite flat surfaces 216 for clamping. It should be understood that the rod guide assembly 20 can be used in a variety of valves in so far the valve has a rod guided for linear movement. It is intended that the valve with above-mentioned rod guide assembly should be included in the scope of protection defined by the appended claims.

It will be appreciated that variations of the above-disclosed and other features and functions, or alternatives thereof, may be desirably combined into many other different systems or applications. It can also be appreciated that various presently unforeseen or unanticipated alternatives, modifications, variations or improvements therein may be subsequently made by those skilled in the art which are also intended to be encompassed by the following claims.

What is claimed is:

1. A rod guide assembly for a valve, comprising:
   a rod guide cover and a rod guide body engaging with each other, the rod guide cover together with the rod guide body defining a guide channel in which the rod is sliding, wherein the friction coefficient between the rod guide body and a rod is smaller than the friction coefficient between the rod guide cover and the rod;
   a first seal constrained in a position between the rod guide cover and the rod guide body, the first seal being arranged around the rod for seal the engagement between the rod and the rod guide assembly;

wherein the rod guide cover comprises a threaded recess, the rod guide body comprising a first end in the proximity of the rod guide cover and a second end contacting with a fluid, the first end of the rod guide body comprising a threaded outer surface, the rod guide body engaging with the rod guide cover via the engagement between the threaded recess of the rod guide cover and the threaded outer surface of the first end of the rod guide body;

wherein a recess for housing the first seal is formed at the first end of the rod guide body;

wherein a second seal is disposed around the rod guide body in the proximity of the second end, the second seal sealing the engagement between the rod guide assembly and a valve casing.

2. The rod guide assembly according to claim 1, wherein the rod guide body comprises a flange, the upper edge of the flange engaging with the rod guide cover and the lower edge of the flange engaging with a stepped boss on the valve casing.

3. The rod guide assembly according to claim 2, wherein the flange comprises an outer surface shaped for engaging with a driving tool.

4. The rod guide assembly according to claim 2, wherein the flange comprises an outer surface shaped for engaging with a driving tool.

5. The rod guide assembly according to claim 1, wherein the rod guide cover is made from an alloy steel and the rod guide body is made from a copper alloy.

6. The rod guide assembly according to claim 1, wherein the rod guide cover is secured to the valve casing by at least one screw, the rod guide cover comprising a slot at a lower surface.

7. A rod guide assembly for a valve, comprising:

a rod guide cover and a rod guide body engaging with each other, the rod guide cover together with the rod guide body defining a guide channel in which the rod is sliding, wherein the friction coefficient between the rod guide body and a rod is smaller than the friction coefficient between the rod guide cover and the rod;

wherein the rod guide assembly further comprises a first seal constrained in a position between the rod guide cover and the rod guide body, the first seal being arranged around the rod for seal the engagement between the rod and the rod guide assembly;

wherein the rod guide cover comprises a threaded recess, the rod guide body comprising a first end in the proximity of the rod guide cover and a second end contacting with a fluid, the first end of the rod guide body comprising a threaded outer surface, the rod guide body engaging with the rod guide cover via the engagement between the threaded recess of the rod guide cover and the threaded outer surface of the first end of the rod guide body; and wherein the rod guide body comprises a flange, the upper edge of the flange engaging with the rod guide cover and the lower edge of the flange engaging with a stepped boss on a valve casing.

8. The rod guide assembly according to claim 7, wherein a recess for housing the first seal is formed at the first end of the rod guide body.

9. The rod guide assembly according to claim 7, wherein the rod guide cover is configured from an alloy steel.

10. The rod guide assembly according to claim 7, wherein the rod guide body is configured from a copper alloy.

11. The rod guide assembly of claim 7, wherein the rod guide cover is secured to the valve casing by screws.

12. The rod guide assembly of claim 7, wherein the rod guide cover comprises a slot at a lower surface.

13. The rod guide assembly according to claim 7, wherein the rod guide cover is configured from an alloy steel and the rod guide body is configured from a copper alloy.

14. The rod guide assembly of claim 7, wherein the rod guide cover is configured with a first material have a first friction coefficient $F_1$ relative to the rod, and the rod guide body is configured with a second material with a second friction coefficient $F_2$ relative to the rod, wherein $F_1 > F_2$.

15. A rod guide assembly for a valve, comprising:

a rod guide cover and a rod guide body engaging with each other, the rod guide cover together with the rod guide body defining a guide channel in which the rod is sliding, wherein the friction coefficient between the rod guide body and a rod is smaller than the friction coefficient between the rod guide cover and the rod;

wherein the rod guide assembly further comprises a first seal constrained in a position between the rod guide cover and the rod guide body, the first seal being arranged around the rod for seal the engagement between the rod and the rod guide assembly;

wherein the rod guide cover comprises a threaded recess, the rod guide body comprising a first end in the proximity of the rod guide cover and a second end contacting with a fluid, the first end of the rod guide body comprising a threaded outer surface, the rod guide body engaging with the rod guide cover via the engagement between the threaded recess of the rod guide cover and the threaded outer surface of the first end of the rod guide body;

wherein a recess for housing the first seal is formed at the first end of the rod guide body;

wherein a second seal is disposed around the rod guide body in the proximity of the second end, the second seal sealing the engagement between the rod guide assembly and the valve casing;

wherein the rod guide body comprises a flange, the upper edge of the flange engaging with the rod guide cover and the lower edge of the flange engaging with a stepped boss on the valve casing; and wherein the flange comprises an outer surface shaped for engaging with a driving tool.

16. The rod guide assembly according to claim 15, wherein the rod guide cover is configured from an alloy steel.

17. The rod guide assembly of claim 15 wherein the rod guide body is configured from a copper alloy.

18. The rod guide assembly according to claim 15, wherein the rod guide cover is secured to the valve casing by screws.

19. The rod guide assembly according to claim 15, wherein the rod guide cover comprises a slot at a lower surface.

20. The rod guide assembly of claim 15, wherein the rod guide cover is configured with a first material have a first friction coefficient $F_1$ relative to the rod, and the rod guide body is configured with a second material with a second friction coefficient $F_2$ relative to the rod, wherein $F_1 > F_2$.

* * * * *